United States Patent [19]

Shea

[11] Patent Number: 5,227,077
[45] Date of Patent: Jul. 13, 1993

[54] LAUNDER WITH BAFFLE SYSTEM FOR RECOVERING FILTRATION MEDIA IN SOLUTION

[75] Inventor: Edward M. Shea, Salt Lake City, Utah

[73] Assignee: Baker Hughes Incorporated, Houston, Tex.

[21] Appl. No.: 841,828

[22] Filed: Feb. 26, 1992

[51] Int. Cl.$^5$ .............................................. B01D 24/46
[52] U.S. Cl. .................................. 210/793; 210/269; 210/271; 210/275; 210/188; 55/185; 55/199
[58] Field of Search .................... 210/793, 195.4, 271, 210/274, 521, 534, 275, 188, 269; 55/185, 186, 199

[56] References Cited

U.S. PATENT DOCUMENTS

| | | | |
|---|---|---|---|
| 2,559,784 | 10/1951 | Moore | 210/275 |
| 2,595,602 | 5/1952 | Parks | 55/186 |
| 2,888,140 | 5/1959 | Hebert | 210/275 |
| 3,346,122 | 10/1967 | Cornelissen | 210/521 |
| 3,353,676 | 11/1967 | Hirsch | 210/197 |
| 3,563,389 | 2/1971 | Mizrahi et al. | 210/521 |
| 4,064,054 | 12/1977 | Anderson et al. | 210/536 |
| 4,076,625 | 2/1978 | Scholten et al. | 210/274 |
| 4,132,652 | 1/1979 | Anderson et al. | 210/536 |
| 4,191,652 | 3/1980 | Whitmore | 210/275 |
| 4,478,726 | 10/1984 | Moore | 210/793 |
| 4,624,783 | 11/1986 | Black et al. | 210/275 |
| 4,743,382 | 5/1988 | Williamson et al. | 210/786 |
| 4,746,431 | 5/1988 | Gibaud et al. | 210/274 |

FOREIGN PATENT DOCUMENTS 1581833 12/1980 United Kingdom .
1581833 12/1992 United Kingdom .

*Primary Examiner*—Robert A. Dawson
*Assistant Examiner*—Ana M. Fortuna
*Attorney, Agent, or Firm*—Trask, Britt & Rossa

[57] ABSTRACT

A launder and baffle structure, used in association with a filtration tank of the type using granular filter media, is disclosed which reduces the amount of filter media lost during a backwashing cycle. The structure of the invention includes an elongated launder, sloping baffle structure associated with the elongated launder and air discharge structure associated with the sloping baffle structure which releases air from beneath the sloping baffle structure, the air having been dissipated from the fluid. The structure of the invention is configured to reduce velocity of flow in order to provide settling of filter media from solution, is configured to provide dissipation of air from solution to further enhance quiescence of flow and settling of filter media from solution, and directs fluid flow away from the launder. The structure of the invention further includes a wing baffle for dissipating velocity in the fluid.

18 Claims, 5 Drawing Sheets

LAUNDER WITH BAFFLE SYSTEM FOR RECOVERING FILTRATION MEDIA IN SOLUTION

BACKGROUND

1. Field of the Invention

This invention relates to filtration systems which use filter media to remove materials in solution, and which include backwash systems or launders. Specifically, this invention relates to baffle systems associated with a launder for producing quiescence in fluid flow and removal of air to enhance settling of filter media from solution to reduce loss of media during backwashing.

2. State of the Art

Filtration systems which use granular filter media, such as sand or gravel, to remove solids or particulates suspended in fluid are well-known in the art. Such systems are often used in wastewater, cleanwater and oil/water separation systems. Filter media filtration systems typically include a tank having drainage apparatus in the bottom of the tank for discharging filtered fluid therethrough and granular media layered on top of the drainage apparatus.

In conventional operation, fluid to be filtered is introduced into the tank, and downward movement of the fluid through the granular media causes solids and particulate matter to accumulate in the media. The filtered fluid drains to the bottom and exits the tank through the drainage apparatus. After hours of operation, the solids and particulates which have accumulated in the granular media reduce the efficacy of the filtration system and must be cleaned.

The drainage apparatus at the bottom of the tank is typically configured to provide backwashing or reverse filtration in which water and air are flushed back through the drainage apparatus and upwardly through the filter media to remove the accumulated solids and particulates. Launders, also referred to as troughs, are positioned in the upper portion of the tank, above the filter media. As water entering from the drainage apparatus fills the tank, the backwash spills over into the launders and is carried away from the tank.

It is known that forcing water and air through the filter media during backwashing is the most efficient means of removing accumulated solids and particulates. However, turbulence from the air causes lighter filtration media to be dislodged from the bed, and it is eventually discharged into the launder with the backwash. A considerable loss of filter media can result.

Others in the field have designed backwashing systems to reduce the amount of media lost during backwash. Examples of various systems are disclosed in U.S. Pat. No. 3,353,676 to Hirsch, issued Nov. 21, 1967; U.S. Pat. No. 4,076,625 to Scholten et al., issued Feb. 28, 1978; U.S. Pat. No. 4,132,652 to Anderson et al., issued Jan. 2, 1979; and, U.S. Pat. No. 4,746,431 to Gibaud et al., issued May 24, 1988.

Baffle systems have been developed which deflect and direct fluid flow in the area of the launder. U.S. Pat. No. 4,076,625 discloses a system in which curved baffles are positioned on either side of a launder to provide restricted channels on either side of the launder thereby directing the upward flow of fluid in a manner to allow media to fall back into the tank. By restricting flow around the launder, the flow velocity is reduced below the settling velocity of the media and media settles back into the tank.

Most launder and baffle systems address only reduction of flow velocity as a means of promoting settlement of the media, and do not address direction of flow or the disposition of air in suspension as a means of further reducing turbulence and thereby enhancing settling of the media. Therefore, it would be an advancement in the field to provide structure associated with a launder which reduces flow velocity, which directs flow away from the launder and which provides dissipation of air from the fluid to promote more efficient settling of filtration media therefrom.

SUMMARY OF THE INVENTION

Baffle structure associated with a launder is provided which directs flow away from the launder while reducing flow velocity of fluid circulating near the launder to promote settling of filter media therefrom, and provides means for releasing and dissipating air from the fluid to further promote settling of filter media therefrom. While the launder and associated baffle structure of the present invention are applicable to various filtration systems generally, this disclosure focusses on use of the invention with wastewater filtration systems as an example.

The launder of the invention is an elongated trough which is generally sized to span across the width or diameter of a filtration tank, and is positioned in the upper portion of the tank. The launder may typically have a rounded bottom surface and upstanding sides forming an edge over which fluid flows during backwashing. Backwash fluid entering the launder is carried away from the launder by effluent pipes associated with the launder.

Baffle structure is associated with the launder, and generally comprises a sloping baffle extending the length of the launder, a wing baffle positioned above the sloping baffle and air discharge structure for releasing air trapped beneath the sloping baffle. An additional sloping baffle may be positioned over the launder and above the first sloping baffle to direct fluid away from the open top of the launder. Support structures maintain the sloping baffle or baffles in place relative to the launder. Baffle structure may be associated with one side of the launder only or, in a preferred embodiment, may be associated with both sides of the launder.

The sloping baffle is attached to the upper portion of the launder and is angled away from the side of the launder to provide a surface against which fluid may flow to dissipate energy. The sloping baffle is structured to reduce flow velocity as well as direct the flow away from the launder. The sloping baffle further provides a space at the top thereof into which air rises as it comes out of solution. Release of the air from solution further enhances quiescence of the fluid and aids in settling of filter media from solution.

Air discharge structures are located along the length of the sloping baffle and generally comprise partially enclosed housings having a passageway which communicates with the space provided in the sloping baffle. Thus, air travels in the space toward the air discharge structures where it enters and is dissipated from the air discharge structure.

A wing baffle is positioned above the sloping baffle and is substantially parallel to the launder. The wing baffle may be a single, vertical wall or, alternatively, may comprise a vertical wall having a downward sloping embankment against which fluid may flow and filter media may travel as it settles into the tank. Fluid which travels from beneath the sloping baffle is directed upwardly and flows over the wing baffle. Fluid then circulates between the wing baffle and the launder, or second sloping baffle, which further reduces flow velocity and enhances settling of filter media from the fluid.

A second sloping baffle may be positioned above the first sloping baffle which extends over the open top of the launder. The second sloping baffle and the first sloping baffle provide a surface against which fluid may flow to reduce flow velocity, and against which settling filter media may move as it settles back into the tank. Support structure positioned between the second sloping baffles on either side of the launder secure the baffles in place.

In operation, fluid rising from the tank during backwashing impacts against the bottom surface of the launder and is directed against and below the sloping baffle. Fluid circulating beneath the sloping baffle is reduced in velocity resulting in settling out of some filter media. Some fluid is trapped beneath the sloping baffle and is eventually directed away from the baffle and launder. The fluid then flows upwardly over the wing baffle where the flow velocity is reduced further, and settling is enhanced. Fluid substantially free of filter media flows over the upper surface of the launder to enter into the launder.

BRIEF DESCRIPTION OF THE ILLUSTRATED EMBODIMENTS

In the drawings, which illustrate what is currently regarded as the best mode for carrying out the invention, FIG. 1 is a view in perspective of a launder and baffle system of the invention installed in a tank, some portions being broken away;

DETAILED DESCRIPTION OF THE ILLUSTRATED EMBODIMENTS

Figure 1:
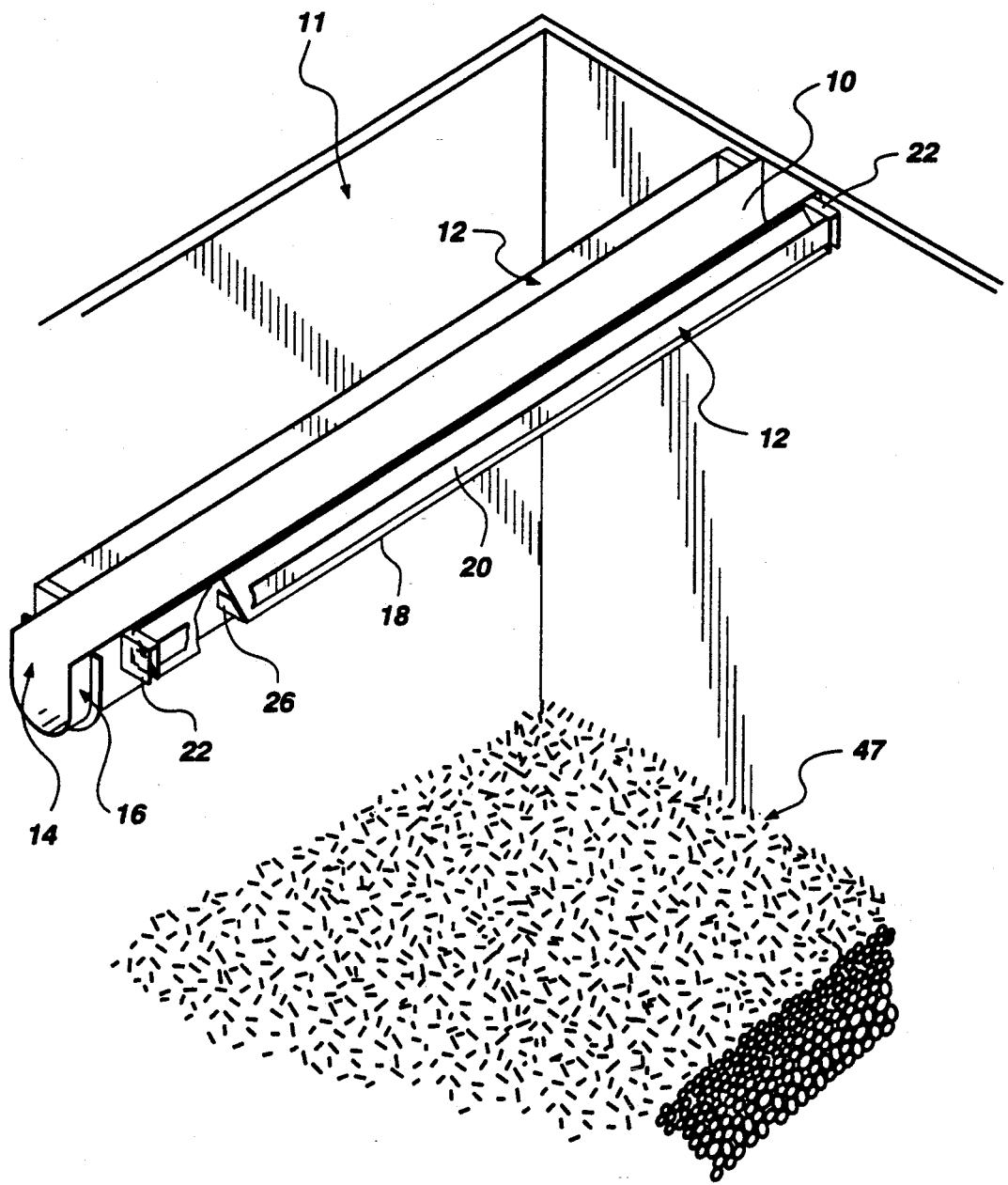

As shown by FIG. 1, the present invention includes a launder 10, into which fluid flows during a backwashing cycle, and baffle structure 12 associated with the launder 10 for reducing flow velocity of the fluid and for removing air from solution to encourage settling of granular media from the fluid.

The launder 10 is in the form of a trough, having parallel vertical sides 14, 16. The launder 10 is positioned at the top of a wastewater tank 11, and may be secured to the top or side wall of the tank 11 by several means known in the art. A particularly suitable securement means comprises cementing the launder 10 into the walls of the tank 11.

A baffle system 12 may be associated with either vertical side 14, 16 of the launder 10, and may suitably be associated with both vertical sides 14, 16 as illustrated in FIG. 1. The baffle system 12 generally includes a sloping baffle 18 which is secured to and angled away from the vertical side 16 of the launder 10, a wing baffle 20 positioned substantially parallel to the vertical side 16 of the launder 10 and above the sloping baffle 18, and air discharging structure 22 positioned at either end of the baffle system 12. The sloping baffle 18 and the wing baffle 20 may extend substantially the full length of the launder 10.

Figure 2:
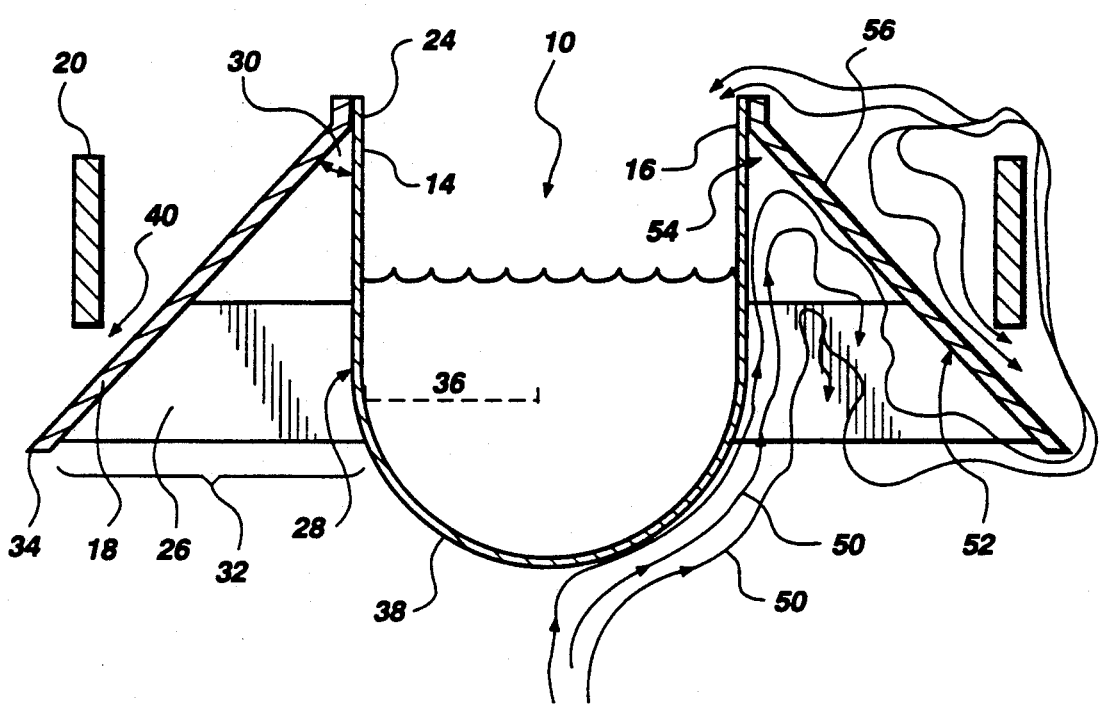
FIG. 2 is a view in cross section of the launder and baffle shown in FIG. 1.
Figure 3:
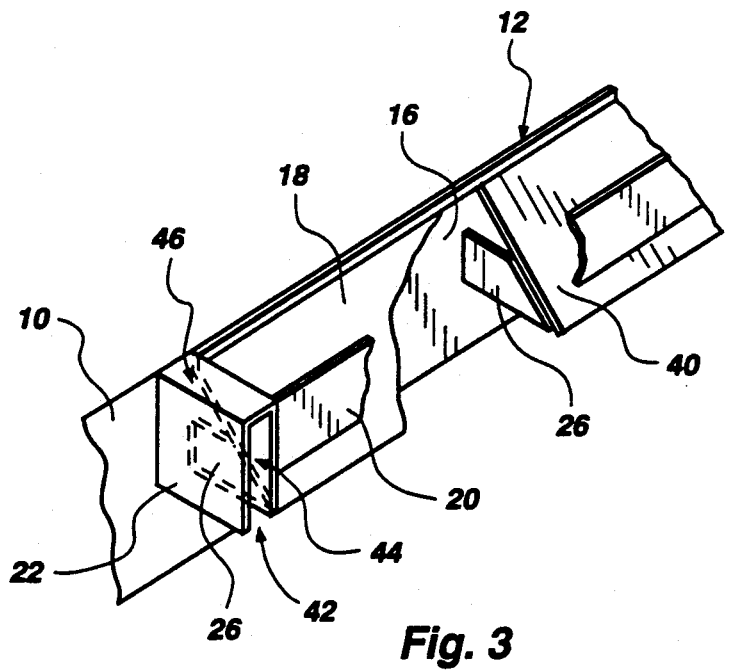
FIG. 3 is an enlarged view of the launder and baffle system shown in FIG. 1, some portions being broken away.

As more clearly illustrated by FIGS. 2 and 3, the sloping baffle 18 is secured to the launder 10 near the upper edge 24 of the launder 10. The sloping baffle 18 is positioned at an angle to the vertical sides 14, 16 of the launder 10. The sloping baffle 18 is maintained in position by support members 26 which interconnect between the sloping baffle 18 and the exterior surface 28 of the launder 10. A number of support members 26 may be positioned along the length of the launder 10 to secure the sloping baffle 18 thereto.

The angle 30 between the vertical sides 14, 16 and the sloping baffle is at least 30°, and may be as great as 60° or more. Preferably, the angle 30 is about 45°. The angle 30 of the slope influences the reduction in flow velocity, and thus the quiescence, of the fluid circulating beneath the sloping baffle 18, as described further below. The distance 32 between the end 34 of the sloping baffle 18 and the exterior surface 28 of the launder is approximately fifty percent of the radius 36 of the bottom 38 of the launder 10.

A wing baffle 20 is positioned above the sloping baffle 18 and is substantially parallel to the vertical sides 14, 16 of the launder 10. The wing baffle 20 is secured at both ends to the air discharging structures 22, as illustrated in FIGS. 1 and 3. The wing baffle 20 is positioned above the sloping baffle 18 in a manner which provides a space 40 between the sloping baffle 18 and the wing baffle 20. The space 40 permits movement of fluid and granular material between the sloping baffle 18 and the wing baffle 20. Air discharging structures are located at either end of the baffle structure 12, as shown in FIG.1, but may be located at various points along the length of the baffle structure 12. The air discharge structures 22 are partially enclosed, having an open bottom portion 42 and an opening 44 directed away from the launder 10. A passageway 46 is formed between the air discharge structure 22, the support member 26, and the sloping baffle 18 to direct fluid from beneath the sloping baffle 18 and away from the launder 10. The passageway 46 also permits release of air trapped beneath the sloping baffle 18, as described further hereinafter.

During the backwashing cycle in a filtration tank 11, water is flushed through the bottom of the tank 11 and air is added or sparged into the fluid to increase removal of solids and particulates from the granular media 47. Water flows upwardly towards the bottom 38 of the launder 10 and eventually fills the tank 11 to the edge 24 of the launder 10. As best illustrated by the right side of FIG. 2, the fluid, represented by arrows 50 flows toward and around the bottom 38 of the launder 10. As it rounds the bottom 38, fluid velocity increases. Absent the baffle structure 12, the fluid would quickly rise to the top 24 of the launder 10 and would flow over into the launder 10. Fine granular filter media which is in solution would be lost with the fluid.

In accordance with the present invention, fluid flowing around the bottom 38 flows beneath the sloping baffle 18 and impacts the lower surface 50 thereof. As a result, fluid velocity is decreased allowing an initial amount of granular filter media to settle out of the fluid. Some of the fluid continues to circulate around the end 34 of the sloping baffle 18 and moves outwardly as indicated. Some of the fluid is retained beneath the sloping baffle 18 and moves laterally along the underside of the sloping baffle 18 to be released through the air discharge structure via the passageway 46 and the opening 44. The air discharge structure 22 thus directs fluid away from the launder 10.

In addition to fluid which circulates beneath the sloping baffle, air comes out of suspension as the fluid velocity decreases and the air becomes trapped at the top angle 54 below the sloping baffle 18. Air bubbles in suspension tend to maintain particulates, such as granular filter media, in the fluid. As the air comes out of suspension, granular filter media is released from association with the air and the media settles downwardly into the tank 11. Trapped air travels laterally along the top angle 54 of the sloping baffle 18 and is discharged through the passageway 46 of the air discharge structure 22.

Fluid which flows around the end 34 of the sloping baffle 18 and outwardly from the air discharge structure 22 will begin to flow upwardly. It flows around the wing baffle 20, and flows over the top 24 of the launder 10. An amount of fluid circulates downwardly along the upper surface 56 of the sloping baffle 18 and recirculates around the wing baffle 20. As fluid flows over the wing baffle 20, fluid velocity is reduced further and residual amounts of filter media settle out. The filter media floats downwardly over the upper surface 56 of the sloping baffle 18.

Figure 4:
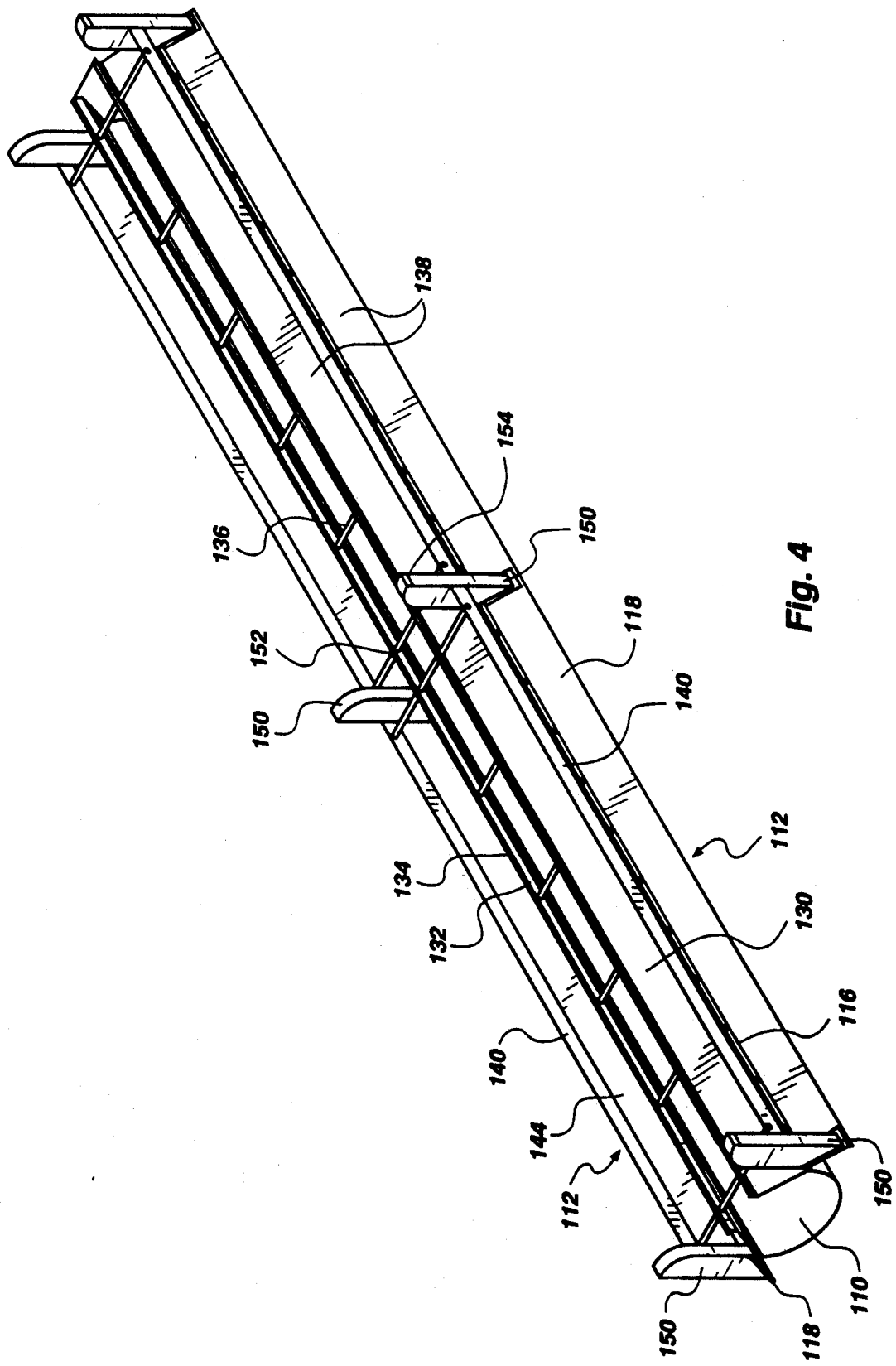
FIG. 4 is a view in perspective of an alternative embodiment of the invention.

An alternative embodiment of the invention is illustrated by FIGS. 4-7, where FIG. 4 shows a full view of the launder 110 and baffle structure 112. The baffle structure 112 extends the length of the launder 110 and may be positioned on one side of the launder or on both sides as illustrated. Referring to FIGS. 4-7, the semi-circular launder 110 of this embodiment has a bottom 114 and an upper edge 116 to which a lower sloping baffle 118 is secured. The lower sloping baffle 118 angles away from the launder 110 at an angle 120 of about 45° to the vertical axis 122 of the launder 110. The angle 120 may be from about 30° to about 60° or more, however. The distance 124 between the end 126 of the lower sloping baffle 118 and the launder 110 is at least fifty percent of the radius 128 of the launder 110.

An upper sloping baffle 130 is also secured to the launder 110 at the upper edge 116 thereof. The upper sloping baffle 130 angles toward the center of the launder 110 at an angle of about 45° to the vertical axis 122. The upper sloping baffle 130 has a vertical face 132 at the top thereof, and a horizontal lip 134 projecting perpendicularly from the vertical face 132 and away from the launder 110. Support structures 136 interconnect one upper sloping baffle 130 to another upper sloping baffle 130. The upper sloping baffle 130 and the lower sloping baffle 118 form, in combination, a continuous surface 138 which slopes away from the launder 110.

Figure 5:
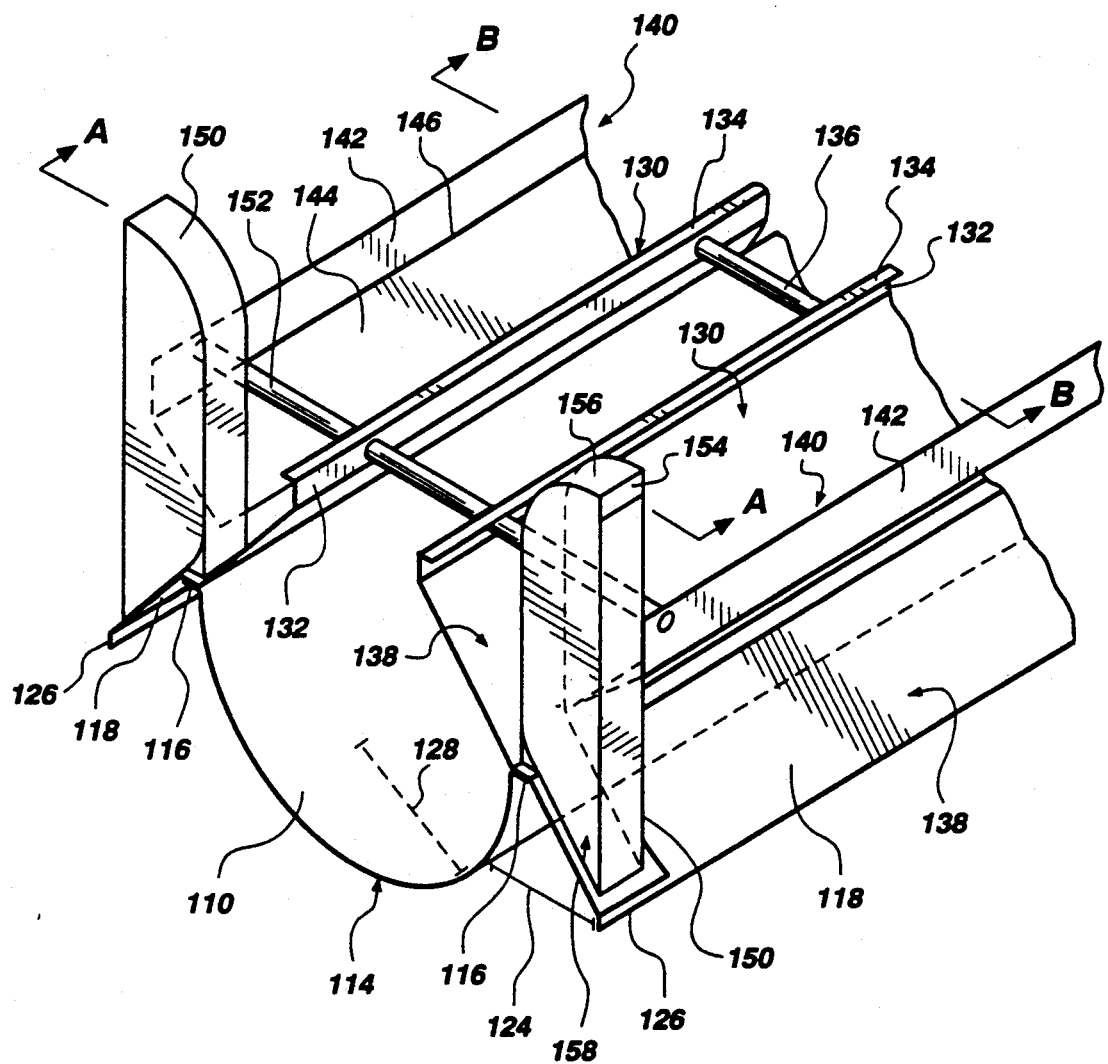
FIG. 5 is an enlarged view of the embodiment shown in FIG. 4.
Figure 7:
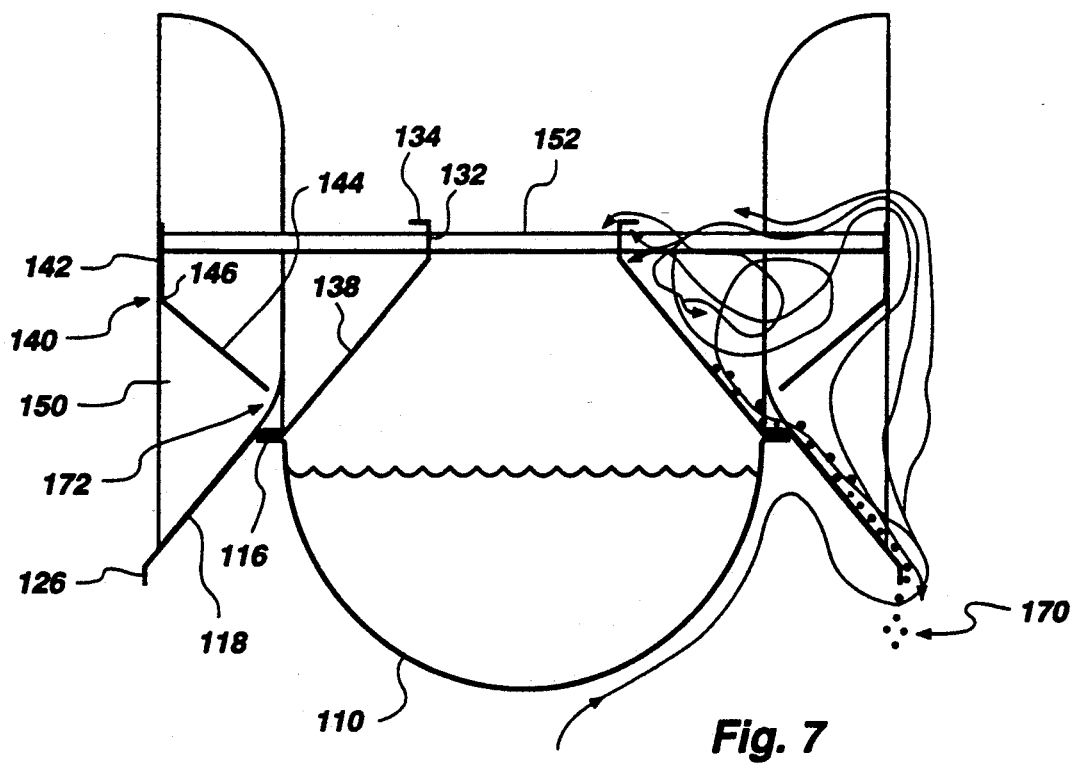
FIG. 7 is a view in cross section of the embodiment shown in FIG. 5 taken at line B—B.

A wing baffle 140 is positioned above the lower sloping baffle 118, and lateral to the upper sloping baffle 118. The wing baffle 140, as best illustrated by FIGS. 5 and 7, comprises a vertical wall 142 and sloping embankment 144 extending from the lower edge 146 of the vertical wall 142 at a right angle to the incline of the upper sloping baffle 130. The wing baffle 140 is secured to the air discharge structures 150 located along the length of the lower sloping baffle 118, and are further secured to the upper sloping baffle 130 by support members 152.

Air discharge structures 150 are secured to the lower sloping baffle 118, and are located along the length of the lower sloping baffle 118. As best illustrated by FIG. 5, the air discharge structures 150 provide an enclosed space 153 with an opening 154 at the top 156 thereof, and a passageway 158 in communication with the underside of the lower sloping baffle 118.

Figure 6:
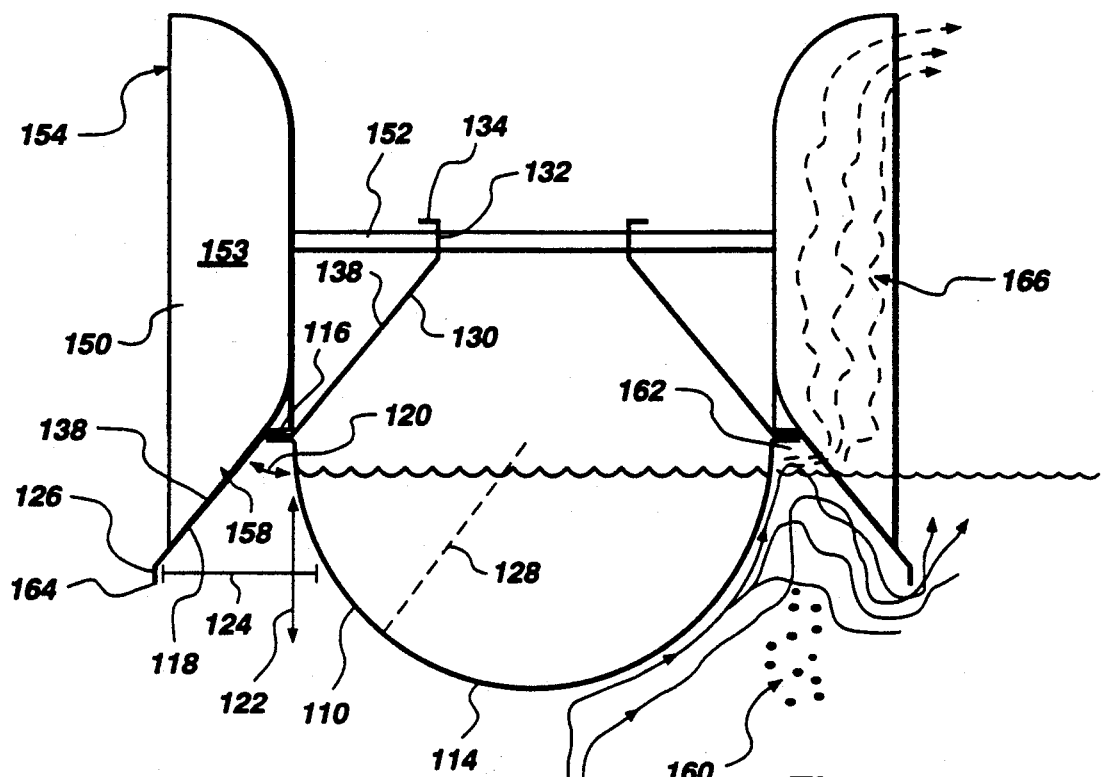
FIG. 6 is a view in cross section of the embodiment shown in FIG. 5 taken at line A—A.

In operation, backwash fluid and air rises from the bottom of the tank (not shown) and impacts against the bottom 114 of the launder 110, as shown by FIGS. 6 and 7. Fluid travels around the bottom 114 of the launder 110 and flows beneath the lower sloping baffle 118. The lower sloping baffle 118 reduces flow velocity of the fluid thereby allowing some filter media, represented at 160, to be released from suspension to fall back into the tank. Fluid continues to flow around the end 126 of the lower sloping baffle 118 and is directed away from the launder 110, due in part to the slant of the lower sloping baffle 118 and due in part to the downwardly extending lip 164 of the end 126.

With reduction in flow velocity, air bubbles in the water come out of solution and rise to a space 162 immediately below the top 116 of the launder 110. The air, represent by broken lines at 166, along with some fluid, enters the passageway 158 between the underside of the lower sloping baffle 118 and the air discharge structure 150. The air 166 rises through the air discharge structure 150 and exits through an opening 154 formed in the upper portion thereof. A larger internal space 153 within the air discharge structure 150 provides more area within which air 166 may circulate, thus preventing backflow of air toward the underside of the lower sloping baffle 118 which may cause fluid to churn violently. Effective removal of air from solution enhances quiescence of the fluid which further enhances settling of filter media from solution.

As best illustrated in FIG. 7, fluid which circulates around the end 126 of the lower sloping baffle 118 continues to flow up and around the wing baffle 140. Fluid impacts the vertical face 132 and horizontal lip 134 of the upper sloping baffle 130 and is directed downwardly over the upper surface 138 of the upper sloping baffle 130. The fluid circulates between the upper sloping baffle 130, the sloping embankment 144, and the vertical wall 142 of the wing baffle 140. Further quiescence of the fluid results, thereby enhancing further settling of filter media from solution.

The filter media, represented by 170, drifts downwardly along the upper surface 138 of the upper sloping baffle 130, through the gap 172 formed between the sloping embankment 144 and the upper surface 138, and down the lower sloping baffle 118. The filter media 170 is directed toward the bottom of the tank by the extending lip 164. Fluid which flows over the horizontal lip 134 of the upper sloping baffle 130 flows into the launder 110. The fluid entering the launder is substantially free of filter media.

The present invention may be used in many applications in addition to that of wastewater treatment tanks having backwashing structure, as described above. The present invention may be employed successfully, for example, in water treatment associated with mining operations to recover desired components from mine effluent, in clean water treatment, or in any other context generally requiring water treatment or sedimentation. Reference herein to specific details of the illustrated embodiments is by way of example and not by way of limitation. It will be apparent to those skilled in the art that many modifications of the basic illustrated embodiment may be made without departing from the spirit and scope of the invention as recited by the claims.

What is claimed is:

1. Structure for reducing media loss during backwashing in a filtration system of the type using granular filter media, comprising:
   an elongated launder having a bottom surface, spaced apart sides, and an open top, said elongated launder being attachable to a tank of said filtration system and positionable above said granular filter media therein;
   sloping baffle structure associated with said launder and structured to reduce flow velocity of fluid flowing thereabout;
   a wing baffle associated with said launder and positioned proximate said sloping baffle structure, said wing baffle being structured to reduce flow velocity of said fluid circulating about said sloping baffle structure; and
   air discharge structure associated with said sloping baffle structure to provide release of air disassociated from said fluid.

2. The structure of claim 1 wherein said sloping baffle structure is configured to direct the flow of said fluid away from said launder.

3. The structure of claim 2 wherein said sloping baffle structure is secured to said sides of said launder and is inclined away from said sides of said launder.

4. The structure of claim 3 wherein a space is formed between said wing baffle and said sloping baffle structure to provide movement of fluid and filter media therebetween.

5. The structure of claim 4 wherein said sloping baffle structure comprises a first sloping baffle secured to said launder, said first sloping baffle being inclined downwardly relative to said launder and directed away from said sides of said launder, and a second sloping baffle positioned above said open top of said launder and above said first sloping baffle, said first and second sloping baffles providing a continuous sloping surface directed away from said top of said launder.

6. The structure of claim 1 wherein said air discharge structure is configured to provide an area for expansion of air prior to release from said discharge.

7. A structure for reducing media loss during backwashing in a filtration system of the type using granular filter media, comprising:
   an elongated launder having a rounded bottom surface, spaced apart sides each having an upper edge, and an open top, said elongated launder being attachable to a tank of said filtration system and positionable above said granular filter media therein;
   sloping baffle structure attached to said upper edge of said elongated launder, said baffle extending the length of said elongated launder;
   air discharge structures attached to said sloping baffle structure along the length thereof, said air discharge structures being in communication with said sloping baffle structure to provide release of air trapped thereunder; and
   a wing baffle positioned proximate to said sloping baffle structure to provide a space therebetween, said wing baffle extending the length of said sloping baffle structure and being configured to reduce flow velocity of fluid circulating about said sloping baffle.

8. The structure of claim 7 wherein said sloping baffle is inclined away from said launder to direct flow of fluid away from said launder.

9. The structure of claim 8 wherein said sloping baffle is inclined away from said launder at an angle of at least forty-five degrees.

10. The structure of claim 8 wherein said wing baffle comprises a substantially vertical wall aligned parallel to said sides of said launder.

11. The structure of claim 10 wherein said sloping baffle structure comprises a first sloping baffle secured to said upper edge of said launder and being inclined downwardly, and a second sloping baffle positioned above said open top of said launder and positioned above said first sloping baffle, said first and second sloping baffle providing a continuous sloping surface inclined away from said launder.

12. The structure of claim 11 wherein said second sloping baffle includes a lip formed at the top thereof, said lip being structured to reduce flow of fluid thereover into said launder.

13. The structure of claim 12 wherein said first sloping baffle includes a lip formed at the bottom thereof structured to direct settling filter media downwardly toward said tank.

14. The structure of claim 13 wherein said wing baffle further comprises an inclined embankment extending downwardly from said vertical wall, said inclined embankment sloping toward said first sloping baffle.

15. The structure of claim 8 wherein said air discharge structure is configured to provide an area for expansion of air prior to release from said air discharge structure.

16. A method of reducing loss of media during a backwashing cycle in a filtration tank using granular filtration media comprising:
   providing in a filtration tank structure comprising:
      an elongated launder having a bottom and spaced apart sides;
      sloping baffle structure associated with said launder, said sloping baffle structure being inclined away from said launder and being structured to direct fluid away from said launder;
      air discharge structure associated with said sloping baffle to release air trapped beneath said sloping baffle structure; and
      wing baffle structure positioned proximate said sloping baffle structure;
   operating said filtration tank in a backwashing cycle; and
   directing said fluid toward said bottom of said launder to urge said fluid toward said baffle structure to dissipate the velocity of said fluid, to dissipate air from said fluid and to direct said fluid away from said launder.

17. The method according to claim 16 wherein said sloping baffle structure comprises an inclined baffle attached to said launder, said sloping baffle being directed downwardly and away from said launder.

18. The method according to claim 16 wherein said sloping baffle structure comprises a first inclined baffle attached to said launder, said first sloping baffle being directed downwardly and away from said launder, and a second sloping baffle positioned above said launder and above said first sloping baffle, said first and second sloping baffles being structured to provide a continuous inclined surface directed away from said launder.

* * * * *